United States Patent [19]

Chappell et al.

[11] 4,010,111
[45] Mar. 1, 1977

[54] CORROSION INHIBITOR USED IN BRINES CONTAINING OXYGEN

[75] Inventors: George D. Chappell, Rosenberg; James R. Stanford, Sugar Land, both of Tex.

[73] Assignee: Nalco Chemical Company, Oak Brook, Ill.

[22] Filed: Mar. 29, 1976

[21] Appl. No.: 671,456

Related U.S. Application Data

[63] Continuation-in-part of Ser. No. 441,614, Feb. 11, 1974, abandoned, which is a continuation-in-part of Ser. No. 271,462, July 13, 1972, abandoned.

[52] U.S. Cl. .............................. 252/391; 21/2.7 R; 21/2.5 R; 252/8.55 E; 252/392
[51] Int. Cl.² .................. C23F 11/16; C23F 11/14; C23F 11/12
[58] Field of Search .............. 252/391, 392, 8.55 E; 21/2.5 R, 2.7 R

[56] References Cited

UNITED STATES PATENTS

| | | | |
|---|---|---|---|
| 2,598,213 | 5/1952 | Blair | 252/8.55 E |
| 3,200,071 | 8/1965 | Stromberg | 252/8.55 E |
| 3,412,024 | 11/1968 | Stanford | 252/8.55 E |
| 3,549,532 | 12/1970 | Stanford et al. | 252/8.55 E |
| 3,623,979 | 11/1971 | Maddox | 252/8.55 E |
| 3,712,862 | 1/1973 | Bundrant et al. | 252/8.55 E |

*Primary Examiner*—Benjamin R. Padgett
*Assistant Examiner*—Irwin Gluck
*Attorney, Agent, or Firm*—John G. Premo; Robert A. Miller; Barry W. Sufrin

[57] ABSTRACT

A corrosion inhibiting composition for aqueous brine water containing dissolved oxygen therein is prepared by the reaction of a carboxylic acid containing from 1 to 48 carbon atoms with a polyamine having the structure $H_2N(-R-NH)_xH$ where R is an alkylene group containing from 2 to 6 carbon atoms and $x$ is a small whole number greater than 1.

9 Claims, No Drawings

CORROSION INHIBITOR USED IN BRINES CONTAINING OXYGEN

This application is a continuation-in-part of application 441,614 filed Feb. 11, 1974, now abandoned, which was in turn a continuation-in-part of Ser. No. 271,462 filed July 13, 1972 and now abandoned.

INTRODUCTION

This invention relates to a new corrosion inhibiting chemical composition useful in preventing or minimizing corrosion of iron or steel tubing, other well parts, and the like which comes in contact with corrosive sweet and sour crude oils, especially those containing corrosive brines containing dissolved oxygen recovered with the oil; and to methods of inhibiting such corrosion.

Corrosion inhibitors used in sweet and sour systems are known to the art and typical corrosion inhibitors are disclosed in U.S. Pat. No. 3,412,024 and 3,549,532. The compositions taught in these references are not effective in brine waters containing dissolved oxygen. The corrosion inhibiting composition prepared in this invention teaches a composition which has excellent corrosion inhibition properties in systems which have oxygen dissolved.

OBJECTS

An object of this invention is to provide new compounds useful, for example, in inhibiting corrosion of metal equipment in oil and gas wells.

Another object of the invention is to provide chemicals for use in preventing corrosion of pipe or equipment which is in contact with a corrosive oil-containing medium having dissolved oxygen in oil wells, refineries or the like.

Still a further object of the invention is to provide corrosion inhibiting chemicals for protecting metals and systems which are subject to contact by various corrosive agents such as carbon dioxide, aqueous or non-aqueous solutions of carbon dioxide, hydrogen sulfide, aqueous or non-aqueous solutions of hydrogen sulfide, brines, weak inorganic acids and organic acids.

A still further object is to provide methods of inhibiting corrosion of ferrous metals in contact with said corrosive media with the aforesaid chemicals.

An additional object of this invention is to provide a new corrosion inhibition composition which has improved corrosion inhibition properties in brine waters containing dissolved oxygen.

A further additional object of this invention is to provide new and improved corrosion inhibiting compositions which are readily absorbed by metal surfaces.

Other objects will appear hereinafter.

THE INVENTION

This invention relates to a corrosion inhibiting composition for aqueous brine waters containing dissolved oxygen therein. The corrosion inhibiting composition is prepared by the following steps:

A. Reacting at from 200° to 250° C for 1 to 3 hours a carboxylic acid containing from 1 to 48 carbon atoms with a polyamine having the structure $H_2N(r—NH)_xH$ where R is an alkylene group containing from 2 to 6 carbon atoms and $x$ is a small whole number greater than 1, wherein the molar ratio of the carboxylic acid to the polyamine ranges from 1:1 to 5:1;

B. Cooling the composition formed in step A;

C. Adding with mixing from 1 to 50% by weight based on polyamine of an alcohol having from 1 to 6 carbon atoms;

D. Adding from 1 to 5% by weight based on the polyamine of an alkyl benzene sulfonic acid;

E. Adding with mixing from 1 to 10% by weight based on polyamine of a high molecular weight organic acid having from 8 to 18 carbon atoms; and F. Adding with mixing from 0.01 to 0.5% by weight based on polyamide of an organic water-in-oil emulsion breaker.

The corrosion inhibiting composition of this invention is prepared by reacting a carboxylic acid containing from 1 to 48 carbon atoms with a polyamine having the structure $H_2N(—R—NH)_xH$ where R is an alkylene group containing from 2 to 6 carbon atoms and $x$ is a small whole number greater than 1. The molar ratio of carboxylic acid to polyamine ranges from 1:1 to 5:1; with the preferred ratio being 3:1. The carboxylic acid and polyamine are mixed together and are heated at from 200° to 250° C. for 1 to 3 hours.

The carboxylic acid used in this invention may be an acyclic monocarboxylic acid or a polycarboxylic acid containing from 1 to 48 carbon atoms and an acyclic chain which is either saturated or olefinically unsaturated. The acids further may comprise in part cyclic carboxylic acids, notably rosin acids, such as rosin acid in crude tall oil the chief rosin acid of which is abietic acid. The preferred carboxylic acid is a crude tall oil fatty acid.

The polyamines may be polyalkylene polyamines having 3 to about 10 amino groups and 2 to 6 carbon alkylene groups. There is a number of mixtures of these polyamines commercially available at reasonable costs. The polyamine may also be an aminoalkyl derivative of a basic N-heterocycle such as N-aminoalkyl piperazines wherein the alkyl group has 2 to 6 carbons and aminoalkyl homologs thereof wherein the N-substituent has the formula $H(HNR—)_x$ where R is a alkylene group of 2 to 6 carbon atoms and $x$ is a small whole number greater than 1. The preferred polyamine is diethylene triamine.

Once the carboxylic acid has been reacted with the polyamine, the mixture is cooled to ambient temperature and then from 1 to 50% by weight based on polyamine of an alcohol is added to the mixture. The alcohol may have from 1 to 6 carbon atoms. In most cases, alcohols such as, for example, methanol, normal propanol, butanol, and the like are used. Good results are obtained by using mixtures of these alcohols. Water is also used in admixture with these alcohols.

After the addition of the alcohol from 1 to 5% by weight based on the polyamine of an alkyl-benzene sulfonic acid is added. The alkyl group of the alkyl-benzene sulfonic acid should have from 8 to 16 carbon atoms. Dodecylbenzene sulfonic acid is the preferred compound used. The alkyl-benzene sulfonic acid is blended with the mixture prepared above.

To the reaction mixture prepared above is added from 1 to 10% by weight based on polyamine of a high molecular weight organic acid. These high molecular weight organic acids are characterized as having from 36 to 54 carbon atoms and an acid value of from 183 to 191. A typical composition of such a high molecular weight organic acid is Empol 1040 Trimer Acid. This acid typically contains 80% trimer acid with the remainder being dimer acid. This unique acid has been used primarily as a low-cost flexibilizing curing agent for epoxy resins. Another typical high molecular weight organic acid that could be used is Empol 1041 Trimer Acid which contains 90% timer acid and the remaining 10% being dimer acid. The Empol 1041 exhibits a lighter color and lower viscosity than Empol 1040 as a result of a much higher degree of saturation in the Empol 1041 molecule. This lower viscosity contributes to much easier product handling with Empol 1040. The characteristics of Empol 1040 and Empol 1041 trimer acids are described in Table I below:

TABLE I

|  | Empol 1040 Trimer Acid | Empol 1041 Trimer Acid |
| --- | --- | --- |
| Acid value | 183–191 | 145–185 |
| Sap. value | 192–200 | 170–210 |
| Color Gardner 1963 (Max.) | — | 11 |
| Neutral equivalent | — | — |
| Unsap. (max. %) | — | — |
| Monobasic acids, % | — | — |
| Typical Composition Dimer Acid ($C_{36}$ dibasic acid) M.W. approx. 565 | 20 | 10 |
| Trimer acid ($C_{54}$ tribasic acid) M.W. approx. 845 | 80 | 90 |
| Monobasic acids ($C_{18}$ fatty acids) M.W. approx. 282 | 0 | 0 |
| Refractive index at 25° C. | 1.495 | 1.480 |
| Specific gravity at 25/20° C. | 0.975 | .941 |
| Specific gravity at 100/20° C. | 0.930 | .898 |
| Pounds per gallon at 25° C. | 8.1 | 7.8 |
| Pour point, ° F. | 55 | 20 |
| Flash point, ° F. | 595 | 625 |
| Fire point, ° F. | 680 | 695 |
| Viscosity at 25° C., Gardner-Holdt | Z-6 | Z-6 |
| Viscosity at 25° C., Centistokes | 60,000 | 18,000 |
| Viscosity at 100° F., Centistokes | 21,500 | 6,700 |
| Viscosity at 210° F., Centistokes | 320 | 185 |
| Unsaponifiable, % | 0.3 | 0.3 |
| Surface Tension, dynes/cm at 25° C. | — | — |

After the addition of the organic acid from 0.1 to 0.5% by weight based on the polyamines of an organic water-in-oil emulsion breaker may be added, if necessary. The organic water-in-oil emulsion breakers which can be incorporated into the composition of the invention are disclosed in numerous patents, including among others U.S. Pat. No. 3,042,625; 3,098,827; 3,210,291; 3,206,412; 3,202,615; 3,166,516; and 3,278,637. These water-in-oil emulsion breakers are commonly employed for breaking water-in-oil emulsion. One type of water-in-oil emulsion breaker which is particularly useful in the compositions of the present invention is a mixed ester of a polycarboxylic acid containing 5 to 54 carbon atoms and (a) an oxyalkylated rosin acid containing 2 to 4 carbon atoms in the oxyalkyl groups, and (b) an oxyethylated nonylphenol-formaldehyde resin.

The invention will be further illustrated but is not limited by the following examples in which the quantities are given by weight unless otherwise indicated.

EXAMPLE I

In a three-necked reaction vessel equipped with a stirrer, a Dean-Stark trap, a condenser and a thermometer, there were added, in parts by weight, 177 parts of crude tall oil, 30 parts of a diethylene triamine and 50 parts of $SO_2$ extract, an aromatic hydrocarbon solvent. The mixture was heated to 200° C. Aqueous distillate was removed from the heated reaction mixture in a period of twenty minutes in an amount of 8.5 parts, the temperature rising to about 250°C. The resultant amide reaction product in the solvent was cooled to 150° C., and another 200 parts of $SO_2$ extract were added.

After the product cooled to 80° C. it was stirred and blended with the following chemicals in the order stated:

1. 47 parts isopropanol
2. 51 parts dodecylbenzene sulfonic acid
3. 86 parts methanol
4. 133 parts Empol 1040 acid
5. 225 parts of $SO_2$ extract
6. 10 parts of an emulsion breaker, containing a blend of an ethoxylated nonylphenol resin with a mixed ester of oxyalkylated tripentaerythritol-monoester.

EXAMPLE II

Into the experimental apparatus described in Example I was added 170 parts of crude tall oil, 32 parts of a mixture of polyethylene polyamines containing polyethylene polyamines of the series $H_2N-(R-NH)_xH$ wherein the polyethylene polyamines are higher homologs than tetraethylene pentamine (Polyamine H Solid, Union Carbide and Carbon), and 50 parts of $So_2$ extract, an aromatic hydrocarbon solvent. The mixture was heated to 200° C. Aqueous distillate was removed from the heated reaction mixture during a period of twenty minutes in an amount of 8.7 parts, the temperature rising to about 250° C. The resultant amide reaction product in the solvent was cooled to 150° C and another 200 parts of $So_2$ extract were added.

After the product cooled to 80° C., it was stirred and blended with the following chemicals in the order stated:

1. 47 parts isopropanol
2. 51 parts dodecylbenzene sulfonic acid
3. 86 parts methanol
4. 133 parts Empol 1041 acid
5. 225 parts of $SO_2$ extract
6. 10 parts of an emulsion breaker, containing a blend of an ethoxylated nonylphenol resin with a mixed oxyalkylated tripentaerythritol-monoester.

The corrosion protection values in the following tables were determined by semi-dynamic corrosivity tests, also known as corrosion inhibitor "persistency tests". The degree of protection to be expected from corrosion inhibitors in the produced fluids from oil and gas wells can be evaluated by these tests. They further indicate the minimum dosage at which inhibitors are capable of laying down and maintaining protective films under laboratory conditions simulating well conditions, especially those where inhibitor application is continuous or semicontinuous.

The test simulates squeeze-application of corrosion inhibitors, in which the tubing is exposed for a limited time to inhibitor-rich oil, followed by long-term exposure to produced fluids containing very small amounts of inhibitor.

Weighed metal specimens are exposed to inhibitor-rich oil in an adsorption period, to permit formation of an inhibitor film. The coupons then are transferred to sealed vessels containing produced fluids. The sealed vessels are mounted on a wheel or mounting board and maintained under constant rotation and temperature throughout an exposure-period.

The effectiveness of inhibitors is rated by comparing weight losses of identical specimens in inhibited and uninhibited samples of fluids.

Test cells are filled with the type oil which is to be used as a diluent in the field application of the inhibitor. Inhibitors for evaluation are introduced into the test cells at various high dosages. Control test cells containing no chemical also are run to establish a base corrosion rate. Test normally are run in duplicate.

Weighed metal specimens are inserted and the test cells mounted on a rotating "wheel". In this film-adsorption-step the sealed test vessels are maintained under constant temperature and rotation for 1 to 2 hours. chemical concentrations in the adsorption step range up to 250,000 ppm.

The specimens then are removed from the test cells and rinsed in uninhibited diluent until no visible inhibitor film remains. If necessary, the coupons are blotted to remove excess chemical.

The specimens are transferred to test cells filled with fresh produced fluids at the same oil/water ratio as exists in the fluid samples. (If a sizeable vapor space exists in the sample bottles as received, the fluids in the bottles are purged with inert gas to remove oxygen. The purged samples then are saturated with carbon dioxide, if they are from sweet gas condensate wells, or are saturated with hydrogen sulfide if they are from sour wells.) The test cells are remounted on the rotating wheel. The sealed test vessels are maintained under constant temperature and rotation rate during this exposure step. The test fluids used in the exposure step contain no chemical, or small concentrations of chemical, depending upon anticipated field conditions.

Following exposure, the specimens are removed, degreased in acetone or benzene and scrubbed with soap and water. If corrosion products still adhere to the surface, they are removed by dipping the coupons in inhibited, technical-grade hydrochloric acid. After cleaning, the coupons are immersed in alcohol, then in acetone or benzene, dried and reweighed.

$$\frac{(\text{wt. loss uninhibited} - \text{wt. loss with inhibitor})}{\text{wt. loss uninhibited}} \times 100 = \% \text{ Protection}$$

Test conditions may be varied to simulate field conditions, but they generally fall within the following ranges:

TABLE II

| | | |
|---|---|---|
| (1) | Volume of test cells | 180 ml |
| (2) | Surface area of specimen per unit volume | 11.41 sq.ft./bbl. (1 cm²/15 ml) maximum |
| (3) | Temperature range | Room temp. to 200° F. |
| (4) | Type specimen | Mild steel plate or carbon steel rod |
| (5) | Surface of specimen | Sandblasted or polished |
| (6) | Adsorption period | 1-2 hours |
| (7) | Adsorption step-inhibitor dosage | 500 to 100,000 ppm |
| (8) | Exposure period | Usually 24 hours |
| (9) | Exposure step-inhibitor dosage | 0 to 200 ppm |
| (10) | Rotation rate | 24 rpm |

Corrosion rates determined in this test typically are in excess of rates encountered in the field. This acceleration and magnification of corrosive attack shows up the differences between chemicals and thus is an effective screening procedure.

The following rough correlation exists between percent protection, as furnished by inhibitors in this laboratory test, and performance of the inhibitors in the field:

TABLE III

| PROTECTION BY INHIBITOR IN LAB TESTS | INHIBITOR PERFORMANCE IN THE FIELD |
|---|---|
| 90% or more | Excellent |
| 57% to 89% | Good |
| 50% to 74% | Fair |
| Less than 50% | Poor |

The sample size required for evaluation of one or more inhibitors in field fluid is one gallon minimum. Samples should be taken at the same oil/water ratio as occurs in typical production from the well. In sampling wells in which production is predominately one fluid, care must be taken to insure that sufficient volume of the minor fluid is present. Preferable practice is to sample one gallon of the mixed fluids, then furnish an additional quart of the minor phase.

If the inhibitor is to be applied by the squeeze technique, one gallon of the fluid to be used in the field as inhibitor diluent should be submitted also. This fluid is used in the adsorption-step of the laboratory test.

Clean container must be used and sampling lines should be thoroughly flushed before sampling begins. Sampling of wells under chemical treatment should be done immediately before treatment, to minimize the amount of chemical present in the sample.

The tests in the following examples were conducted at about 160° F with mild steel plate for about 24 hours in a 50/50 volume mixture of sweet brine and kerosens saturated with $CO_2$ unless otherwise indicated.

EXAMPLE III

In a three-necked vessel equipped with a stirrer, a DeanStark trap, a condenser and a thermometer, there were added, in parts by weight, 150 parts of crude tall oil, 75 parts of a mixture of polyethylene polyamines containing polyethylene polyamines of the series $H_2N(R—NH)_xH$ wherein the polyethylene polyamines are higher homologs than tetraethylene pentamine (Polyamine H. Solid, Union Carbide and Carbon), and 50 parts of $SO_2$ extract, an aromatic hydrocarbon solvent. The mixture was heated to 150° C. Aqueous distillate was removed from the heated reaction mixture in a period of fifteen minutes in an amount of about 10.5 parts, the temperature rising to about 250° C. The resultant amide reaction product in the solvent was cooled to 150° C., and another 200 parts of $SO_2$ extract were added.

After the product cooled to about 80° C., it was stirred and blended with the following chemicals in the order stated:
1. 290 parts of dodecylbenzene sulfonic acid
2. 580 parts of Empol 1040 Acid
3. 810 parts of $SO_2$ extract
4. 58 parts of methanol
5. 35 parts of polyoxyethylated phenol formaldehyde resin (nonylphenol-formaldehyde resin consisting of approximately 43% resin with the balance polyoxyethylene groups)
6. 23 parts of an emulsion breaker, containing a blend of an ethoxylated nonylphenol resin with a mixed ester of an oxyalkylated tripentaerythritol-monoester.

EXAMPLE IV

The procedure of EXAMPLE I was repeated with 270 parts of Empol 1040 Acid, 100 parts of diethylene triamine and 50 parts of $SO_2$ extract. The aqueous distillate began to distill over at about 160° C. Thirty-seven parts of aqueous distillate were removed in a 23 minute period, during which the temperature rose to about 250° C.

After adding 200 parts of $SO_2$ extract, the following were blended therewith in the order stated:
1. 350 parts dodecylbenzene sulfonic acid
2. 230 parts of Empol 1040 Acid
3. 1830 parts $SO_2$ extract
4. 230 parts isopropyl alcohol
5. 7 parts emulsion breaker of Example I.

It should be noted that Examples III and IV are identical to the first two examples of U.S. Pat. No. 3,412,024.

In order to illustrate the improved corrosion inhibition properties of the subject invention as compared to the prior art of U.S. Pat. No. 3,412,024 certain "wheel test" experiments were performed on the composition made in Examples I–IV. The results are illustrated in TABLES IV – IX.

TABLE IV

Conditions:
Fluid: Kerosene and 5% NaCl Brine
Acid Gas: $CO_2$
Temperature: 160° F.
Time: Absorbed from 50/50 Kerosene/Brine for one hour
Exposed 50/50 Kerosene/Brine for 23 hours.

| Chemical | Concentration in ppm × 1000 | Percent Inhibition |
|---|---|---|
| Ex. 1 | 10 | 99 |
| Ex. 1 | 20 | 99 |
| Ex. 1 | 50 | 98 |
| Ex. 2 | 10 | 98 |
| Ex. 2 | 20 | 99 |
| Ex. 2 | 50 | 98 |
| Ex. 3 | 10 | 73 |
| Ex. 3 | 20 | 90 |
| Ex. 3 | 50 | 99 |
| Ex. 4 | 10 | 71 |
| Ex. 4 | 20 | 87 |
| Ex. 4 | 50 | 98 |
| Blank | 0 | 0 |

TABLE V

Conditions:
Fluid: Kerosene and 5% NaCl Brine
Acid Gas: $H_2S$ saturated
Oil/Water Ratio: 40/160
Temperature: 160° F.
Time: 24 hours
Absorbed from 50/50 Kerosene/Brine for one hour
Exposed at 40/160 Kerosene/Brine for 23 hours

| Chemical | Concentration in ppm × 1000 | Percent Inhibition |
|---|---|---|
| Ex. 1 | 10 | 81 |
| Ex. 1 | 20 | 80 |
| Ex. 1 | 50 | 84 |
| Ex. 2 | 10 | 79 |
| Ex. 2 | 20 | 80 |
| Ex. 2 | 50 | 82 |
| Ex. 3 | 10 | 63 |
| Ex. 3 | 20 | 70 |
| Ex. 3 | 50 | 79 |
| Ex. 4 | 10 | 61 |
| Ex. 4 | 20 | 67 |
| Ex. 4 | 50 | 75 |

TABLE VI

Conditions:
Fluid: Kerosene and 5% NaCl Brine
Acid Gas: Saturated with $H_2S$
Oil/Water Ratio: 10/190
Temperature: 160° F.
Time: 24 hours
Absorbed from 50/50 Kerosene/Brine for one hour
Exposed at 10/190 Kerosene/Brine for 23 hours

| Chemical | Concentration in ppm × 1000 | Percent Inhibition |
|---|---|---|
| Ex. 1 | 10 | 86 |
| Ex. 1 | 20 | 84 |
| Ex. 1 | 50 | 87 |
| Ex. 2 | 10 | 88 |
| Ex. 2 | 20 | 84 |
| Ex. 2 | 50 | 89 |
| Ex. 3 | 10 | 53 |
| Ex. 3 | 20 | 73 |
| Ex. 3 | 50 | 70 |
| Ex. 4 | 10 | 58 |
| Ex. 4 | 20 | 65 |
| Ex. 4 | 50 | 69 |

TABLE VII

Conditions:
Fluid: Produced Crude from Victoria, Kansas
Sample 1
Temperature: 160° F.
Time: Absorbed from 50/50 produced fluid for one hour
Exposed for 23 hours.

| Chemical | Concentration in ppm × 1000 | Percent Inhibition |
|---|---|---|
| Ex. 1 | 10 | 83 |
| Ex. 1 | 20 | 92 |
| Ex. 2 | 10 | 84 |
| Ex. 2 | 20 | 95 |
| Ex. 3 | 10 | 57 |
| Ex. 3 | 20 | 64 |
| Ex. 4 | 10 | 72 |
| Ex. 4 | 20 | 67 |

TABLE VIII

Conditions:
Fluid: Produced Crude from Victoria, Kansas
Sample 2
Temperature: 160° F.
Time: Absorbed from 50/50 produced fluid for one hour
Exposed for 23 hours.

| Chemical | Concentration in ppm × 1000 | Percent Inhibition |
|---|---|---|
| Ex. 1 | 25 | 81 |
| Ex. 1 | 50 | 88 |
| Ex. 1 | 100 | 92 |
| Ex. 2 | 25 | 76 |
| Ex. 2 | 50 | 81 |

TABLE VIII-continued

Conditions:
Fluid: Produced Crude from Victoria, Kansas
  Sample 2
Temperature: 160° F.
Time: Absorbed from 50/50 produced fluid for one hour
  Exposed for 23 hours.

| Chemical | Concentration in ppm × 1000 | Percent Inhibition |
|---|---|---|
| Ex. 2 | 100 | 78 |
| Ex. 3 | 25 | 36 |
| Ex. 3 | 50 | 42 |
| Ex. 3 | 100 | 52 |
| Ex. 4 | 25 | 52 |
| Ex. 4 | 50 | 52 |
| Ex. 4 | 100 | 59 |

TABLE IX

Conditions:
Fluid: Produced Crude from Sidney, Nebraska
Temperature: 160° F.
Time: Absorbed from 50/50 produced fluid for one hour
  Exposed for 23 hours.

| Chemical | Concentration in ppm × 1000 | Percent Inhibition |
|---|---|---|
| Ex. 1 | 10 | 90 |
| Ex. 1 | 20 | 91 |
| Ex. 2 | 10 | 90 |
| Ex. 2 | 20 | 91 |
| Ex. 3 | 10 | 0 |
| Ex. 3 | 20 | 0 |
| Ex. 4 | 10 | 0 |
| Ex. 4 | 20 | 0 |

The results from these tables clearly illustrate the improvement of the subject invention as compared to that taught in the prior art. The data presented above illustrates the fact that by increasing the ratio of carboxylic acid to polyamine improved corrosion inhibition is obtained. This improved corrosion inhibition is evident in sweet and sour system whereas in U.S. Pat. No. 3,412,024 effective corrosion inhibition was obtained only in sour systems but was ineffective in sweet systems.

We claim:

1. A corrosion inhibiting composition for aqueous brine water containing dissolved oxygen therein, said corrosion inhibiting composition prepared by the following steps:
   A. reacting at from 200° to 250° C for 1 to 3 hours a carboxylic acid from the group consisting of acyclic monocarboxylic acid and polycarboxylic acid containing from 1 to 48 carbon atoms with a polyamine having the structure $H_2N(R—NH)_xH$ wherein R is an alkylene group containing from 2 to 6 carbon atoms and x is a small whole number greater than 1, wherein the molar ratio of said carboxylic acid to said polyamine ranges from 1:1 to 5:1;
   B. cooling the composition formed in step A;
   C. adding with mixing from 1 to 50% by weight based on polyamine of an alcohol from the group consisting of methanol, n-propanol, butanol and mixtures thereof;
   D. adding from 1 to 5% by weight based on said polyamine of dodecylbenzene sulfonic acid;
   E. adding with mixing from 1 to 10% by weight based on said polyamine of a high molecular weight organic acid from the group consisting of dimer and trimer acids and mixtures thereof having from 36 to 54 carbon atoms; and
   F. adding with mixing from 0.01 to 0.5% by weight based on said polyamine of an organic water-in-oil emulsion breaker.

2. A corrosion inhibiting composition for aqueous brine waters containing dissolved oxygen therein of claim 1 wherein the carboxylic acid is a crude tall oil fatty acid.

3. A corrosion inhibiting composition for aqueous brine waters containing dissolved oxygen therein of claim 1 wherein said polyamine is diethylene triamine.

4. A corrosion inhibiting composition for aqueous brine waters containing dissolved oxygen therein of claim 1 wherein the alcohol of step C is isopropanol.

5. A corrosion inhibiting composition for aqueous brine waters containing dissolved oxygen therein of claim 1 wherein the alkyl-benzene sulfonic acid of step D is dodecylbenzene sulfonic acid.

6. A corrosion inhibiting composition for aqueous brine waters containing dissolved oxygen therein of claim 1 wherein the alcohol of step D is methyl alcohol.

7. A corrosion inhibiting composition for aqueous brine waters containing dissolved oxygen therein of claim 1 wherein the ratio of said carboxylic acid to said polyamine is 3:1.

8. A corrosion inhibiting composition for aqueous brine waters containing dissolved oxygen therein of claim 1 wherein the emulsion breaker of step F is a mixed ester of a polycarboxylic acid containing 5 to 54 carbon atoms and (a) an oxyalkylated rosin acid containing 2 to 4 carbon atoms in the oxyalkyl groups, and (b) an oxyethylated nonylphenol-formaldehyde resin.

9. A corrosion inhibiting composition for aqueous brine waters containing dissolved oxygen therein of claim 1 wherein the corrosion inhibiting composition of claim 1 is diluted in the ratio of 20:80 to 80:20 with an organic solvent.

* * * * *